April 19, 1966 G. DORNBERGER 3,246,519
MEASUREMENT OF TEMPERATURE OF ADVANCING WIRE
Filed Oct. 8, 1962      2 Sheets-Sheet 1
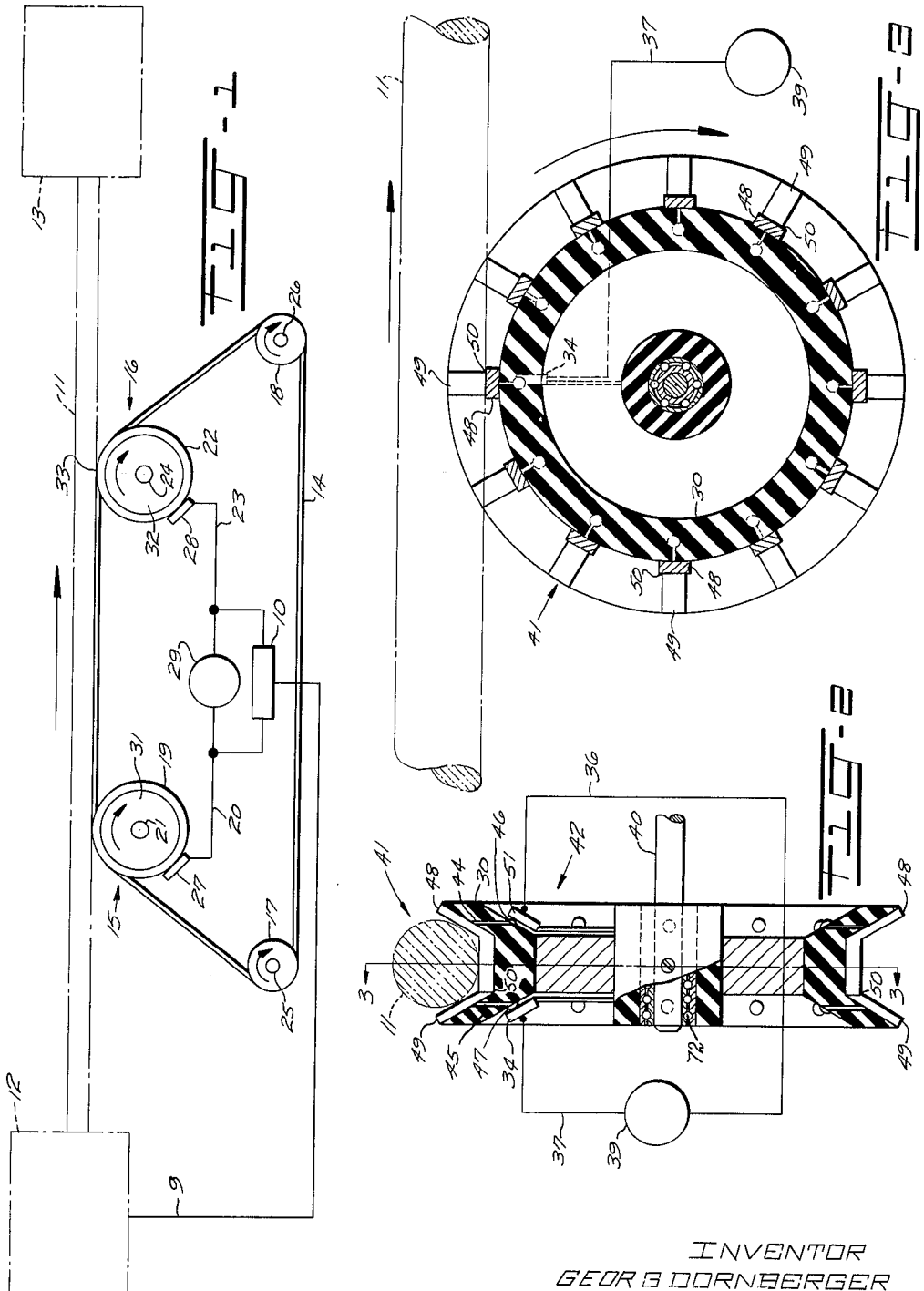
INVENTOR
GEORG DORNBERGER
BY A. J. Nugent
ATTORNEY April 19, 1966  G. DORNBERGER  3,246,519
MEASUREMENT OF TEMPERATURE OF ADVANCING WIRE
Filed Oct. 8, 1962  2 Sheets-Sheet 2
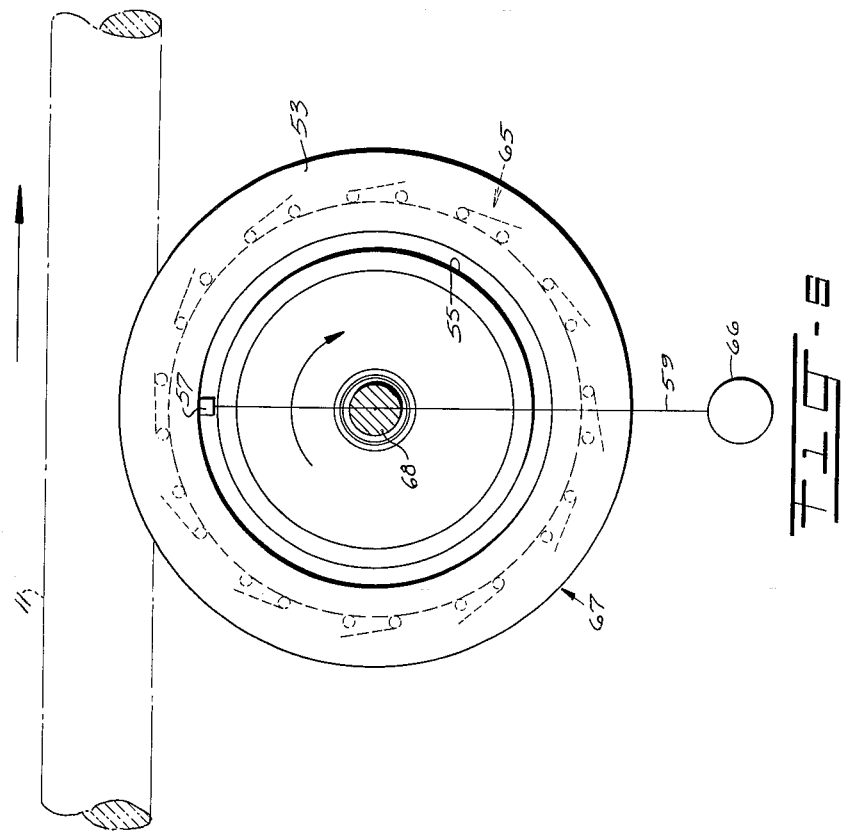
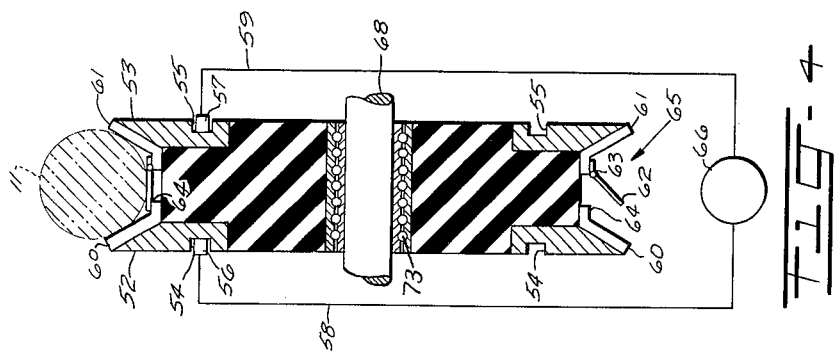
INVENTOR
GEORG DORNBERGER
BY A. J. Nugent
ATTORNEY United States Patent Office 3,246,519
Patented Apr. 19, 1966

3,246,519
MEASUREMENT OF TEMPERATURE OF ADVANCING WIRE
Georg Dornberger, Union, N.J., assignor to Western Electric Company, Incorporated, New York, N.Y., a corporation of New York
Filed Oct. 8, 1962, Ser. No. 228,816
13 Claims. (Cl. 73—341)

This invention relates to a method and apparatus for determining the temperature of a moving wire or cable.

In the production of insulated cable, it is often necessary to accurately determine the temperature of a moving cable as it leaves the insulation extruder. It is known that the thickness of a cable's insulation can be determined by the capacitance of the insulation. The capacitance, however, which is a function of the insulation's thickness, is also a function of the dielectric constant of the insulation. The dielectric constant, in turn, varies with the temperature of the cable. Consequently, in order to accurately control the thickness of the insulation of the cable, the temperature of the cable at the point where the dielectric constant is determined must be known. In order to closely control cable production, the thickness of the cable is measured shortly after the insulation is extruded upon the conductive cable core. Due to the high temperature required for extrusion, the temperature at the point of measurement is sufficiently high to be within the range of thermoelectric pyrometry. Although the art of thermoelectric pyrometry is well-known, its application to a moving cable has not been possible because of the error produced by the friction of the thermocouple rubbing on the moving cable.

Prior to the present invention, temperature sensitive materials were touched to the moving cable to determine if the cable's temperature was above or below the predetermined melting point of the temperature sensitive materials. By use of such materials, for example, Tempilsticks, having a graduated series of melting points, an attempt to determine the temperature of the cable insulation was made but the rubbing of the moving cable against the Tempilstick caused excessive error. Thus, it becomes self-evident that the ability to precisely determine, on a continuous basis, the temperature of a moving cable is a sorely needed expedient in the cable art.

The object of the present invention is a method and device for accurately and continuously measuring the temperature of a moving cable.

A further object is to provide a thermoelectric device which can determine the temperature of a moving cable.

In accordance with the present invention, a thermocouple is formed from two dissimilar metals. Although other thermoelectric metals can be used, copper and constantan are two suitable metals for forming a thermoelectric junction. The junction of the thermocouple, where the two metals are in contact, is placed against the moving cable in any one of various embodiments. In each embodiment, the junction is formed on the periphery of a wheel so that the junction is in rolling contact with the surface of the cable and is not heated from rubbing against the moving cable.

Other objects, features and advantages of the invention will become apparent from the following detailed description.

FIG. 1 is a schematic side view of the invention in a multiple wheel embodiment;
FIG. 2 is a schematic cross-sectional view of a one-wheel embodiment;
FIG. 3 is a section taken along the line 3—3 of FIG. 2;
FIG. 4 is a schematic cross-sectional view of an alternate, one-wheel embodiment; and FIG. 5 is a schematic side view of the alternate embodiment.

Referring now in detail to FIG. 1 of the drawings, a cable 11 is fed from an extruder 12 to a take-up reel 13. A band 14 of the one thermoelectric metal is pressed against the moving cable 11 by a first wheel 15 and a second wheel 16. The first wheel 15 rotates freely by means of anti-friction bearings on an axis 21 and has a rim 19 of the same metal such as copper as the band 14. The second wheel 16, which rotates freely by means of antifriction bearings on an axis 24, has a rim 22 of the second thermoelectric metal such as constantan in contact with the band 14. The inner core 31 of wheel 15 and the inner core 32 of wheel 16 are made from a material such as hardwood, plastic or ceramic which prevents heat absorption and electrical conductivity to the axis 21 and the axis 24, respectively. Two rollers 17, 18 which are also made from a material such as hardwood, plastic or ceramic which prevent heat absorption and electrical conductivity rotate freely on two separate axes 25, 26 to span the band 14 so that it contacts the rims 19, 22 of the first and second wheels 15, 16 at only a very minor portion of their periphery. A brush 27 is placed in contact with the rim 19 of the first wheel 15 and electrically connected to a galvanometer 29 by a lead 20. Another brush 28 contacts the rim 22 of the second wheel 16 and is electrically connected to the galvanometer 29 by the lead 23. The voltage may be fed to a control apparatus 10 such as a computer which feeds back to the extruder 12 by means of a lead 9 to control the temperature of the cable 11 leaving the extruder.

As the cable 11 moves from the extruder 12 to the take-up reel 13, band 14 moves in contact witeh the cable 11 and at the same linear speed as the cable 11. The first and second wheels 15, 16 and the two spanning wheels 17, 18 rotate accordingly in a clockwise direction. Since the band 14 moves freely, the cable 11 will drive the band 14 without slippage, but power from a separate source (not shown) can be regulated and applied to the band 14 to assure that it will move at the same linear speed as the cable. The rim 22 of the second wheel 16 and the band 14 both being of relatively low mass, readily attain the temperature of the moving cable. A thermoelectric junction 33 is formed where the band 14 touches the rim 22 of the second wheel 16. A voltage is generated at the junction 33 of the two dissimilar metals which voltage is a function of the temperature of the moving cable 11 in contact with the junction 33. The two brushes 27, 28 with their respective leads 20, 23 connected to galvanometer 29 form a thermoelectirc circuit for measuring the voltage.

FIGS. 2 and 3 show the invention embodied in a single wheel. A wheel 42 rotating freely by means of anti-friction bearings 72 on an axis 40, is placed in tangential contact with the moving cable 11. Separate thermocouple units 41 are equally spaced about the periphery of the wheel 42 so that the moving cable contacts each unit 41 separately and in close succession. The first section 48 of the one thermoelectric metal, for example, copper, and the second section 49 of the other thermoelectric metal, for example, constantan, form a thermocouple unit 41 having a thermoelectric junction 50. The core 30 of the wheel 42 is made of a material such as hardwood, plastic or ceramic to prevent heat absorption and electrical conductivity. The first section 48 of each unit 41 is connected by a lead 44 to a point 46 which contacts a brush 51 connected to a galvanometer 39 by a lead 36. The circuit is completed by a lead 45 connecting the second section 49 to another point 47 which contacts a second brush 34 having a lead 37 connected to the galvanometer 39.

In FIG. 3, as the cable 11 moves from left to right, the wheel 42 rotates clockwise so that the cable 11 contacts each thermocouple unit 41 in sequence and the brushes 51, 34 contact in the same sequence the points 46, 47 which are connected to the unit 41 in contact with the cable 11. Due to the comparatively low mass of the two sections 48, 49 of thermoelectric metals, the temperature of the cable 11 is attained by the thermocouple unit 41 on contact. A voltage is thereby generated at the junction 50 and measured as a function of the temperature by the galvanometer 39.

In FIGS. 4 and 5, a wheel 67 rotates freely by means of anti-friction bearings 73 about an axis 68 with the moving cable 11 in contact with the periphery of the wheel 67 on which thermocouple units 65 are located at equally spaced intervals. Each unit 65 is formed from a first section 60 of one thermoelectric metal and a second section 61 of another thermoelectric metal having attached to it a shutter 62 made from the same thermoelectric metal as the second section 61. The shutter 62 is attached to the second section 61 of thermoelectric metal by means of a spring-loaded hinge 63 which, along with centrifugal force, forces the shutter 62 partially open to avoid contact at the junction 64. As the cable 11 moves from left to right as shown in FIG. 5, the wheel 67 rotates clockwise. As a themocouple unit 65 comes in contact with the cable 11, the shutter 62 is pressed closed by the cable thereby forming a junction 64. The first section 60 of thermoelectric metal is in contact with an electrically conductive part 52 which has a groove 54 therein concentric with the periphery of the wheel 67. A brush 56 is in contact with the groove 54 and is connected to a galvanometer 66 by a lead 58. The thermoelectric circuit is completed by another electrically conductive part 53 being in contact with the second section 61 of thermoelectric metal and having a similar groove 55 as previously described in which a second brush 57 having a lead 59 connected to the galvanometer 66 is in contact. As the thermocouple is heated by the moving cable, a voltage is generated at the junction 64 and is measured by the galvanometer 66, as a function of the temperature of the moving cable 11.

In all of its above embodiments, the invention can also be used for determining the temperature of a non-insulated wire, providing a very thin film of material such as Teflon, is applied to the band 14 shown in FIG. 1 or the thermocouple units 41 shown in FIG. 3 or the thermocouple units 65 shown in FIG. 5, which thin film of material will prevent conductance of the low voltage generated, but will not effect the relatively high temperature heat transfers.

It is understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A device for measuring the temperature of a moving cable comprising:
    means for feeding said cable in a linear path,
    a thermocouple of two dissimilar metals having a predetermined electrothermal relationship including a wheel having a section of one metal and a continuous band of the other material,
    said wheel including an insulating mounting for said section of said one metal,
    means for maintaining rolling contact among the moving cable, the continuous band, and the wheel to make successive point contacts between the feed cable and the thermocouple,
    measuring means for determining the thermoelectric voltage generated by the thermocouple at the point of contact, and
    means for connecting the thermocouple to the measuring means.

2. A device for measuring the temperature of a moving cable comprising:
    a thermocouple of two dissimilar metals having a predetermined electrothermal relationship including a first wheel having an insulating mounting for a section of one metal, a second wheel having an insulating mounting for a section of the other metal, and a continuous band of either metal riding on said wheel sections,
    means for feeding said cable in linear path to engage said band,
    means including one or more spanning wheels, for maintaining rolling contact among the moving cable, the continuous and the wheel section of a metal dissimilar to the metal of the band and for maintaining rolling contact between the other wheel section and the band to make successive point contacts between the feed cable and the thermocouple,
    measuring means for determining the thermoelectric voltage generated by the thermocouple at said points of contact, and
    means for connecting the thermocouple to the measuring means including a brush in contact with the first wheel section and another brush in contact with the second wheel section.

3. A device according to claim 2 including:
    an insulating film on the side of continuous band in contact with the moving cable.

4. A device for measuring the temperature of a moving cable comprising:
    a thermocouple of two dissimilar metals having a predetermined electrothermal relationship including a first wheel having an insulating mounting for a section of one metal, a second wheel having an insulating mounting for a section of the other metal, and a continuous band of either material,
    means, including two spanning wheels, for maintaining rolling contact among the moving cable, the continuous band, and each wheel,
    means for feeding said cable in a linear path to engage said band and make successive point contacts between the cable and the thermocouple,
    measuring means for determining the thermoelectric voltage at said points of contact between the thermocouple including a galvanometer, and
    means for connecting the thermocouple to the measuring means including two brushes, one in contact with each of the two wheels.

5. A device for measuring the temperature of a moving cable comprising:
    a thermocouple of two dissimilar metals having a predetermined electrothermal relationship including a first wheel having an insulating mounting for a section of one metal, a second wheel having an insulating mounting for a section of the other metal, and a continuous band of either material,
    means including two spanning wheels, for maintaining rolling contact among the moving cable, the continuous band, and the first wheel and for maintaining rolling contact among the moving cable, the continuous band, and the second wheel,
    means for feeding said cable in a linear path to engage said band to make successive point contacts between the cable and the thermocouple,
    means for converting the thermoelectric voltage generated at said points of contact by the thermocouple into a feedback signal,
    means for connecting the thermocouple to the converting means including two brushes, one in contact with each of the two wheels, and
    means for applying the feedback signal to the cable producing equipment.

6. A device for measuring the temperature of a moving cable comprising:
  a series of thermocouples of two dissimilar metals having a predetermined electrothermal relationship including a hinged shutter of one of the two dissimilar metals which forms a junction between the two dissimilar metals when closed,
  means including an insulating mounting for said thermocouples for placing each thermocouple in rolling contact with the moving cable in sequence about a fixed axis including an insulated wheel with the series of thermocouples evenly spaced about its periphery,
  means for feeding said cable in a linear path to successively engage each thermocouple to make successive point contacts with said thermocouples,
  measuring means for determining the thermoelectric voltage between the two dissimilar metals of the thermocouple formed by the moving cable pressing the shutter closed, and
  means for connecting the thermocouple in contact with the cable to the measuring means including a set of brushes.

7. A device according to claim 6 including:
  an electrical insulating film on the surface of the two dissimilar metals which contact the moving cable.

8. Apparatus for measuring the temperature of a moving cable comprising:
  means for feeding cable in a linear path,
  rotary means mounted adjacent the linear path of the cable and including an insulating mounting and at least one thermocouple, said thermocouple having one junction which makes only point contact with a linear section of the cable to sense the temperature of said linear section,
  measuring means for determining the electrical quantity generated by said thermocouple, and
  means connecting the thermocouple to said measuring means.

9. A device for measuring the temperature of a moving cable comprising:
  means for feeding a moving cable in a linear path,
  rotor means having a heat insulating mounting and having its periphery in juxtaposition to said linear path of the cable in order that only a tangential portion of said rotor is in contact with the cable at any time,
  a plurality of temperature sensitive devices, mounted at spaced locations about the periphery of said rotor and on the mounting in heat insulating relation to each other, for making point contact with said cable and measuring only the temperature at the point of contact,
  anti-friction bearing means upon which said rotor is mounted in order that the rotor may rotate freely in response to said cable,
  so that as the rotor rotates, each of the spaced temperature sensitive devices arrives seriatim to establish point contact with the cable, enabling each separate temperature sensitive device to take an independent reading.

10. A device according to claim 9 wherein:
  said temperature sensitive devices generate in seriatim a series of electrical quantities,
  galvanometer means for measuring the electrical quantities generated by said temperature sensitive devices, and
  means connecting said of said temperature sensitive devices seriatim to said galvanometer means.

11. A device according to claim 9 wherein:
  said temperature sensitive devices are thermocouples which comprise plates of two dissimilar metals secured to said insulating mounting at spaced locations along said periphery, said plates being flush with the peripheral surface of the rotor so as to maintain the smooth surface thereof and be in a position to make point contact with the cable, the two dissimilar plates at each location being mounted so they are in contact with each other along a side surface thereof thereby forming a thermoelectric junction thereat.

12. A device for measuring the temperature of a moving cable comprising:
  wheel means having an insulating section with a grooved periphery for contacting a moving cable, only a tangenital portion of said wheel contacting the cable at any given time,
  a plurality of thermocouple devices each consisting of two dissimilar metals mounted in said groove at spaced locations along said periphery, said plates being flush with the surface of the groove so as to maintain the smooth surface thereof in a position to make point contact with the cable, the two dissimilar plates at each location being mounted in heat insulating relation with each other,
  galvanometer means for determining the voltage generated at each said thermoelectric junction,
  means for connecting each of said dissimilar metal plates to said galvanometer, said connecting means including conductors leading downwardly from each plate through said wheel to conductive points on the exterior of the hub portion of said wheel, brush means riding on the exterior surface of said hub so as to contact each point as it rotates past, means connecting said brushes to said galvanometer, and
  axis means to which the wheel is mounted by anti-friction bearings in order that said wheel may rotate freely in response to said cable,
  wherein as the wheel rotates each of the spaced thermoelectric junction means arrives seriatim at said point where said wheel contacts the cable, enabling each separate thermoelectric junction means to take an independent measurement.

13. In a device for measuring the temperature of a heated cable,
  a wheel having a peripheral groove,
  a first thermocouple junction means mounted in said groove,
  a second thermocouple junction means positioned in said groove to engage said first thermocouple means,
  means for linearly advancing said cable to make point contact with said second thermocouple junction means at a point where the second thermocouple junction means engages said first thermocouple junction means, and
  means interconnecting said first and second thermocouple junction means for generating a voltage in accordance with the temperature at the point where the second thermocouple junction means engages the first thermocouple junction means.

References Cited by the Examiner

UNITED STATES PATENTS 3,191,437   6/1965   Beard _____ 73—359 X

FOREIGN PATENTS 1,207,113   8/1959   France.

ISAAC LISANN, *Primary Examiner.*